Figure 1:
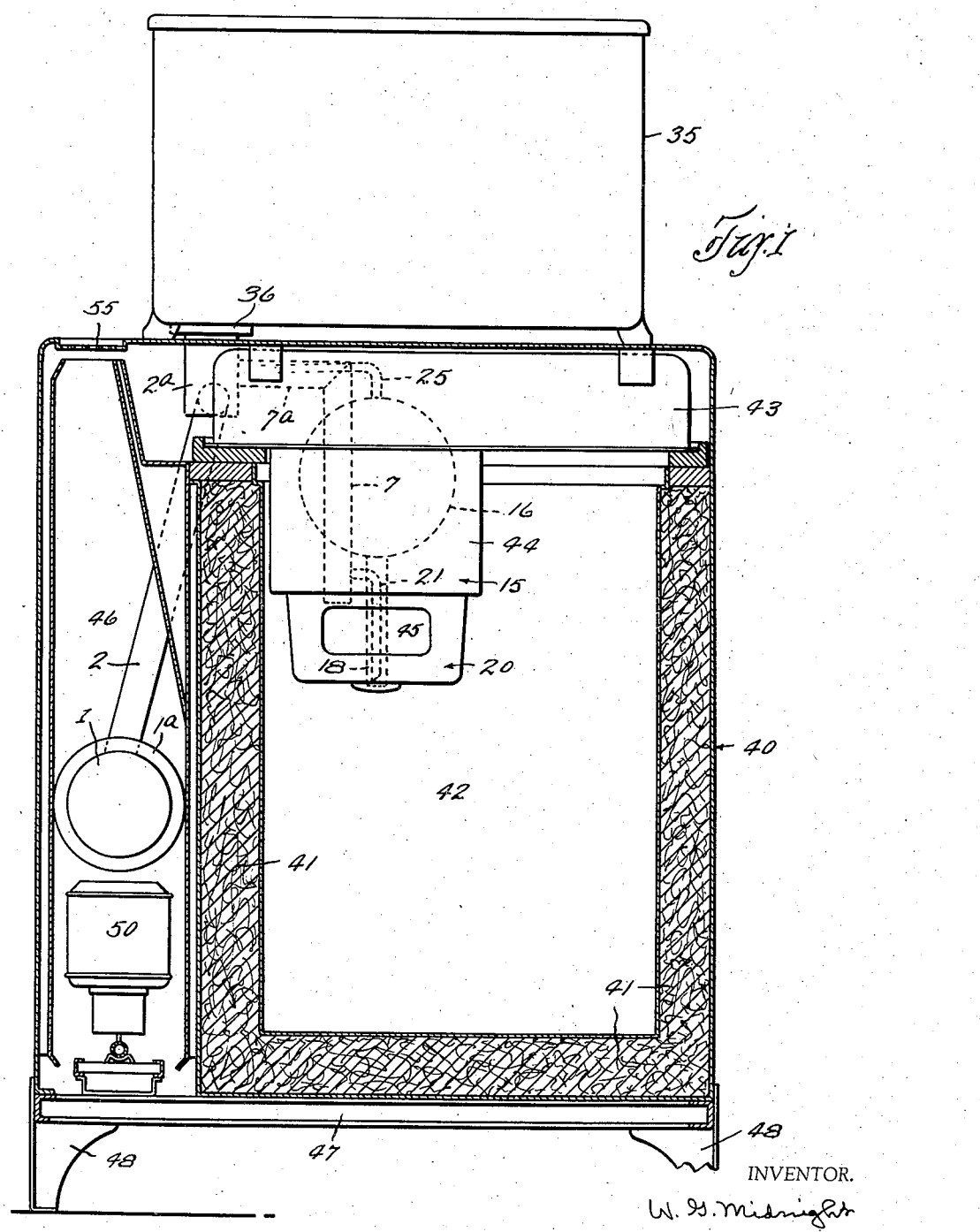

Dec. 1, 1936. W. G. MIDNIGHT 2,062,921
REFRIGERATION APPARATUS
Filed July 2, 1934 7 Sheets-Sheet 2

INVENTOR.
W. G. Midnight
BY Hull, Brock & West
ATTORNEYS.

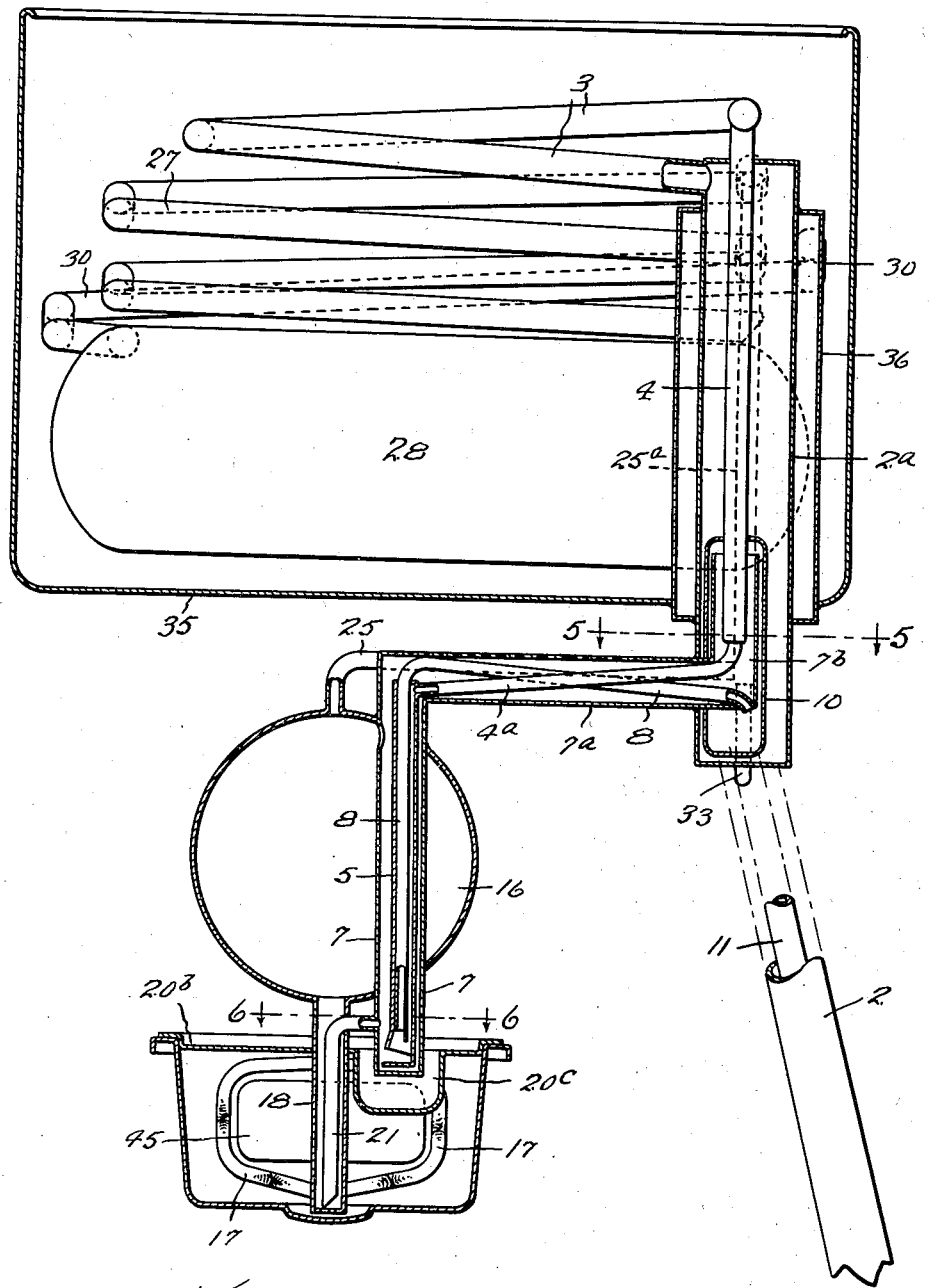

Dec. 1, 1936.　　　W. G. MIDNIGHT　　　2,062,921
REFRIGERATION APPARATUS
Filed July 2, 1934　　　7 Sheets-Sheet 4
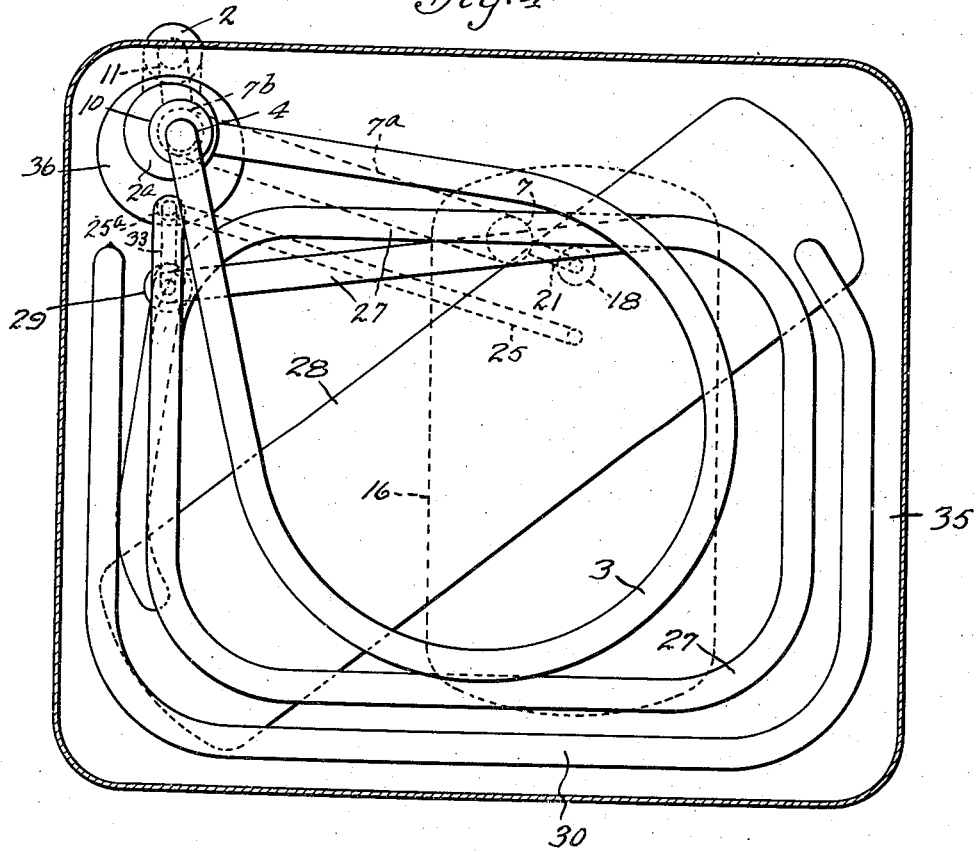
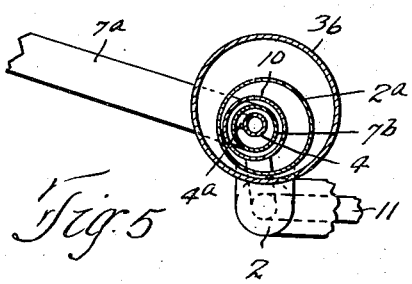
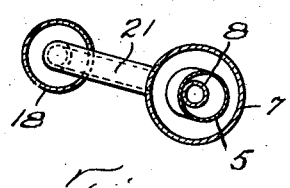
INVENTOR.
W. G. Midnight
BY
Hull, Brock & West
ATTORNEYS.

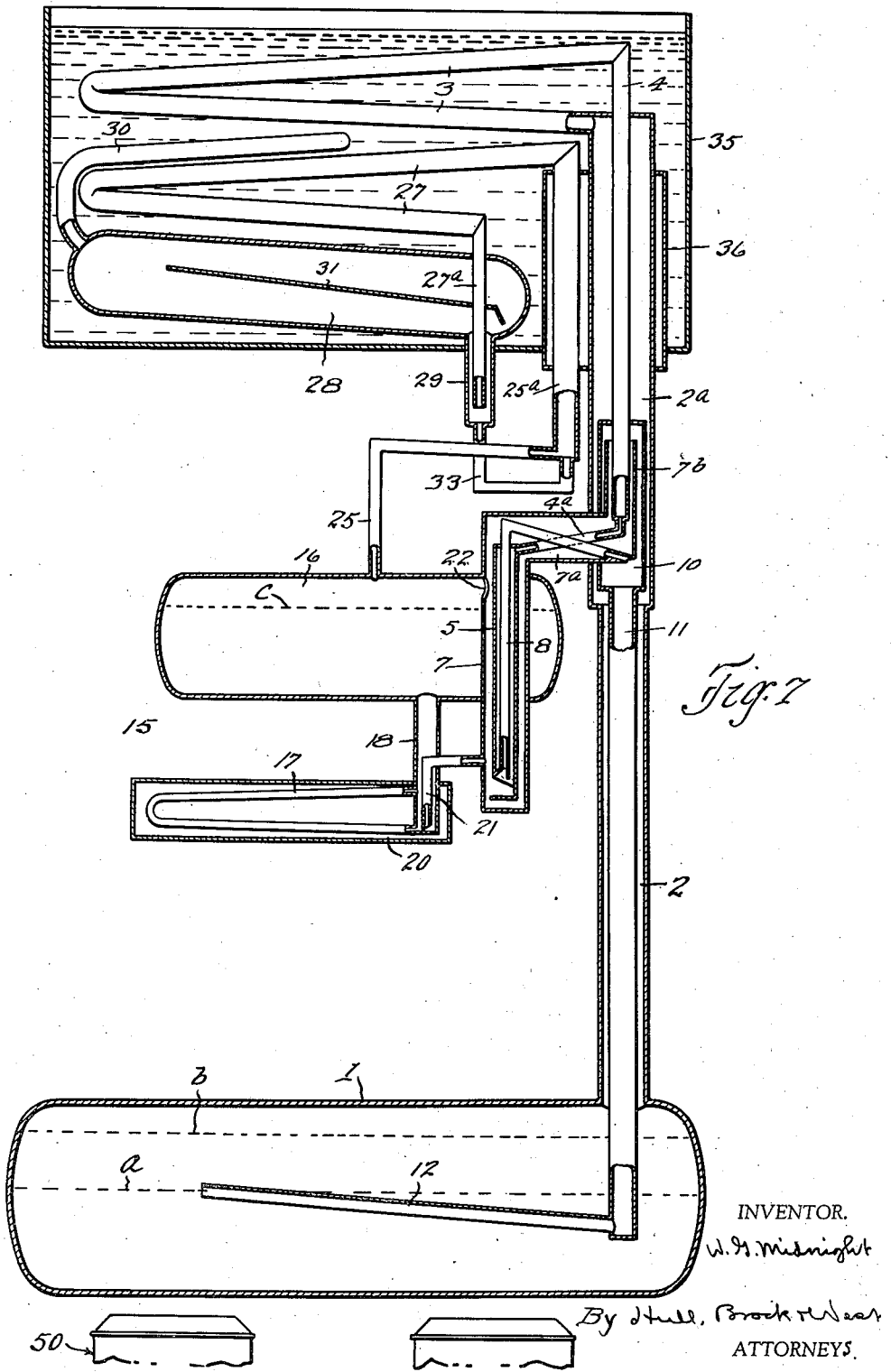

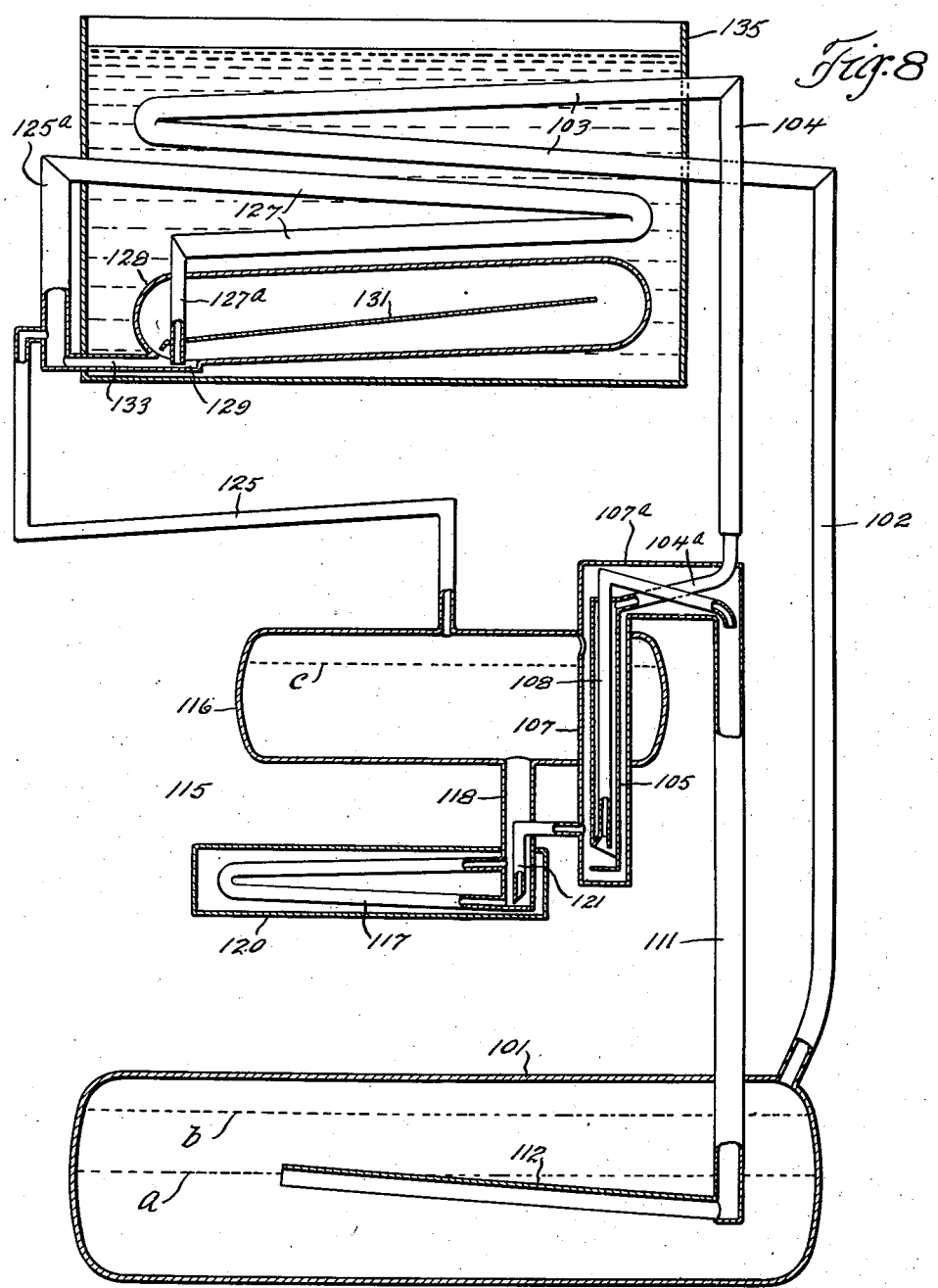

Dec. 1, 1936.  W. G. MIDNIGHT  2,062,921
REFRIGERATION APPARATUS
Filed July 2, 1934   7 Sheets-Sheet 7
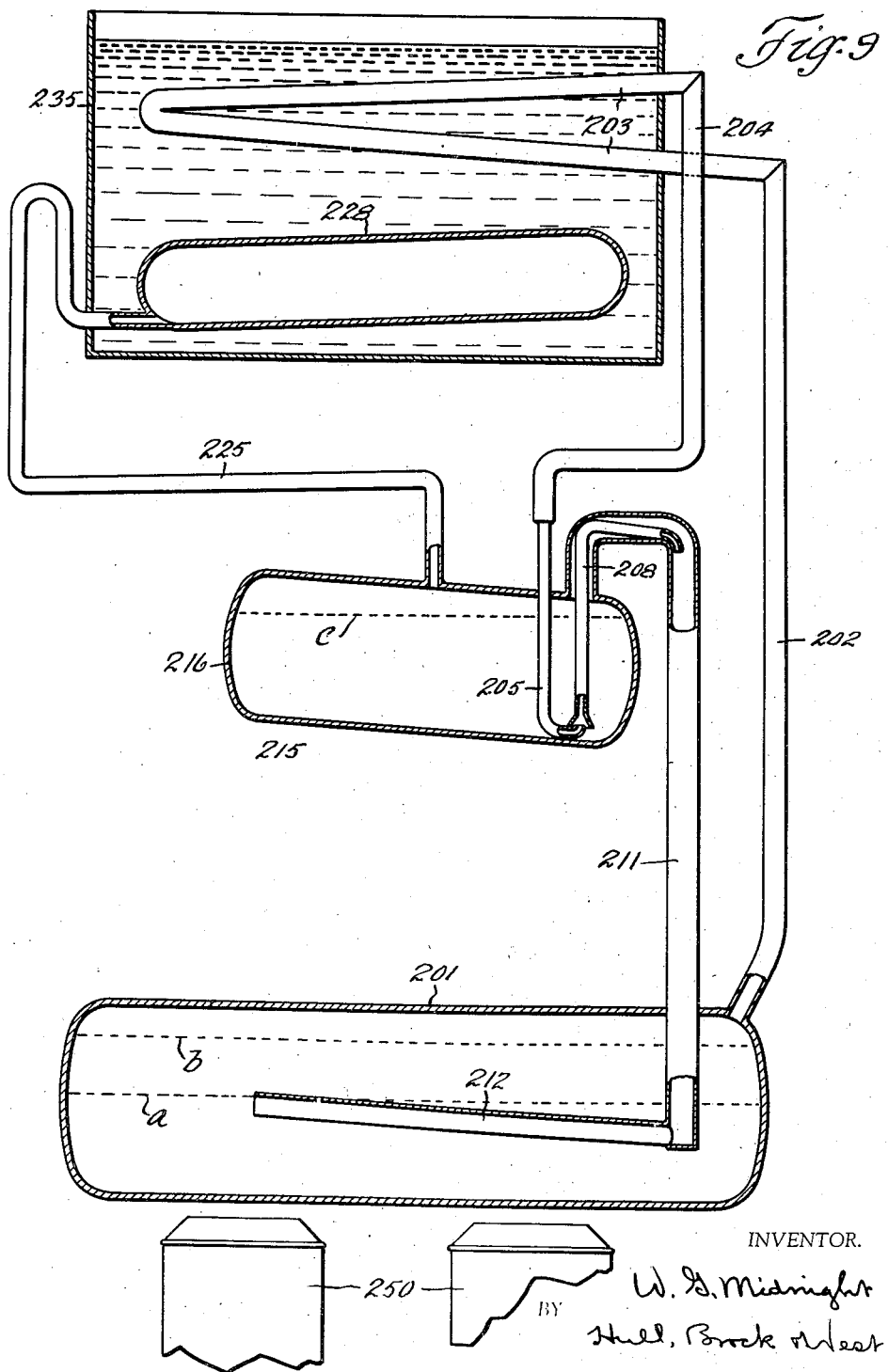

Patented Dec. 1, 1936

2,062,921

UNITED STATES PATENT OFFICE 2,062,921

REFRIGERATION APPARATUS

Wilbur G. Midnight, Bay Village, Ohio, assignor to Perfection Stove Company, Cleveland, Ohio, a corporation of Ohio Application July 2, 1934, Serial No. 733,431

27 Claims. (Cl. 62—120.5)

This invention relates to improvements in absorption refrigeration apparatus or systems, in a general way similar to those that constitute the subject matter of my former application Serial No. 694,453, filed October 20, 1933, and applications filed by Marc Resek on the same date, bearing Serial Numbers 694,455 and 694,456.

Apparatus or systems of the class to which the invention pertains consist, generally, of a generator-absorber section, a condenser, a receiver-evaporator section, and means for conveying vapors from the generator-absorber section to the condenser; condensate from the condenser to the receiver-evaporator section, and gas from the receiver-evaporator section to the generator-absorber section, delivering said gas to the latter below the minimum liquid level therein for reabsorption, together with means for periodically administering heat to the generator-absorber section, the intervals between heating periods being known as cooling periods.

The system is hermetically sealed and contains a quantity of a suitable refrigerant, such as ammonia, and a suitable absorbent therefor, such as water, in proper proportions, this mixture being known as the refrigerant liquor; and at the beginning of a cycle of operation, all, or practically all, of the liquor is present in the generator-absorber section. Upon heat being administered to such section, the liquor boils and a large percentage of refrigerant is distilled over into the receiver-evaporator section, the vapors readily liquefying within the condenser under the pressures then prevailing within the system. Upon the cessation of heat and the consequential reduction of pressure, the anhydrous refrigerant within the receiver-evaporator section gasifies and returns to the generator-absorber section to be reabsorbed in the weak liquor in the latter section.

In the foregoing operation, notwithstanding the employment of dehydrators, rectifiers, or the like, a small amount, at least, of absorbent condensate finds its way with the refrigerant condensate into the receiver-evaporator section of the system during practically every cycle of operation, and unless some means is provided for removing this absorbent solution, which may be termed residue liquid, from the receiver-evaporator section, at relatively frequent intervals, its presence therein will reduce the efficiency of the apparatus, the condition becoming gradually worse as the residue liquid increases in volume during successive cycles of operation.

In my present invention, as in the one constituting the subject matter of my earlier application above referred to, I desirably provide, as one step in the overcoming of the above described evil, an arrangement whereby practically all of the freshly condensed refrigerant is segregated and retained undiluted during the heating period, while the residue liquid left in the receiver-evaporator section at the conclusion of the previous cooling period is being returned to the generator-absorber section and which freshly condensed refrigerant will be liberated within the receiver-evaporator section at the beginning of the ensuing cooling period so that it may gasify and return to the generator-absorber section during such period and in so doing perform its refrigerating function.

In order that the distinguishing characteristics of my present invention may be more clearly pointed out, I may, by way of introduction, explain that prevailing intermittent absorption refrigeration systems having automatic residue liquid returns may be divided into two groups, to-wit:

(1) Those in which freshly condensed refrigerant accumulates in the evaporator, generally above the residue liquid, and wherein the liquid return means, which communicates with the bottom of the evaporator, functions later to return the residue to the generator, usually by overflow when the height of the liquid in the evaporator reaches a certain maximum, or by changes in pressure in the system when the heating period is ended; and (2) Those in which the residue liquid is returned to the generator prior to delivery of the freshly condensed refrigerant to the evaporator.

In the first group are many modifications including some in which a plurality of compartments are utilized that overflow successively from one to another in an attempt to separate the fresh condensate from the residue, together with schemes for elevating the overflow in case the generator is above the evaporator.

None of this group, however, has been commercially successful, mainly because of the mixing of the fresh condensate with the residue, resulting in dilution and loss of the condensate. This is largely for the reason that the quantity of neither the residue nor condensate is constant but depends on the amount of heat supplied, the rate of heating, the temperature of the condenser, the quantity of refrigerant evaporated during the previous cycle and other factors which cannot be controlled.

The present invention belongs to the second group. It is characterized by (a) A gas-lift that is motivated by the gas flowing from the generator to the condenser and acting to lighten a column of residue liquid in the gas-lift and elevate slugs of said liquid from the evaporator to a point from which said liquid can drain to the generator;

(b) A reservoir in which the freshly condensed refrigerant is segregated and temporarily withheld from the evaporator so that it will not be pumped back with the residue liquid, and (c) Means acting after the heating period is over to transfer the refrigerant condensate from said reservoir to the evaporator.

This present system has the following important advantages which distinguish it from any heretofore proposed:

(1) There is no contact or mixing of condensate from the condenser with residue liquid in the evaporator, thus always insuring the lowest possible temperature for the evaporating refrigerant, during the cooling period.

(2) The residue liquid is returned at the beginning of the heating period, and a little at a time, eliminating pressure surges, foaming, and other disturbances that take place when a large quantity of liquid is dumped into the generator, particularly after the latter has become highly heated.

(3) As all liquid in the evaporator is returned to the generator at the beginning of each heating period, there is no danger of overheating the generator due to its containing less than a full charge at the beginning of the heating period. Such overheating, if permitted to occur, would result in decomposition of the charge and formation of non-condensable gas.

(4) The warm gas from the generator, coming in contact with the cold residue liquid, results in a heat interchange which tends to cool the gas and warm the liquid, thus evaporating refrigerant in the residue liquid and condensing absorbent vapors in the gas. As this occurs before the gas reaches the condenser, very little absorbent ever reaches the condenser, resulting in greater condenser efficiency and purer refrigerant condensate.

(5) Any absorbent condensed in the evaporator is immediately returned to the generator by the action of the gas-lift.

(6) The action of this present residue liquid return is independent of length of heating period, rate of heating, temperature of the parts or surrounding atmosphere, or the efficiency of the condenser.

(7) The generator, condenser and evaporator may have almost any position with respect to each other, as liquid does not flow by gravity from one to the other.

Figure 2:
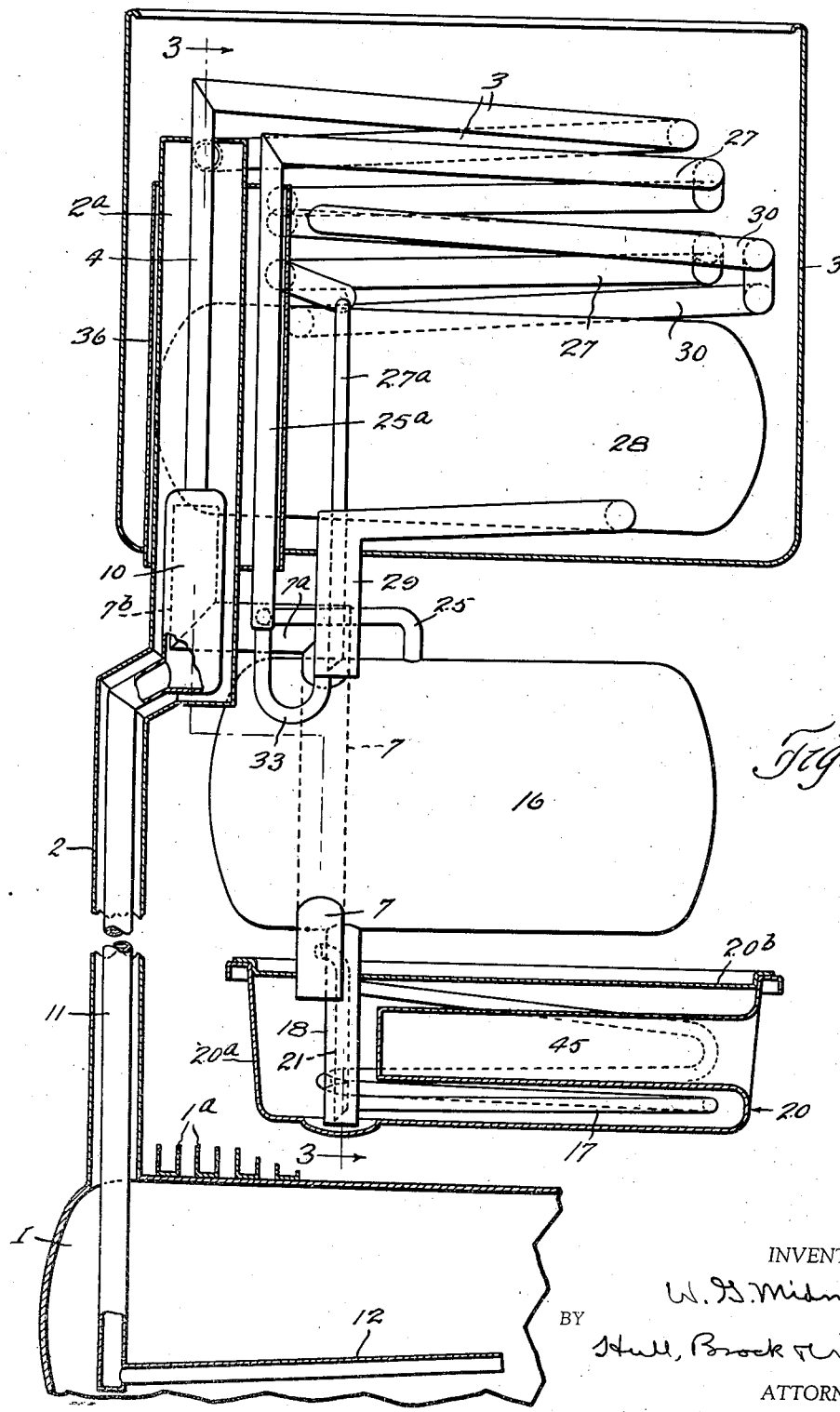

The foregoing advantages with others hereinafter appearing are attained in the embodiments of the invention illustrated in the accompanying drawings wherein Fig. 1 is a sectional front elevation of a refrigerator incorporating the invention; Fig. 2 is a sectional side elevation of the assembly of intercommunicating conduits and vessels that constitutes the hermetically sealed refrigerating system, the same being removed from the cabinet and viewed as from the left of Fig. 1; Fig. 3 is a sectional rear elevation of said assembly, substantially on line 3—3 of Fig. 2; Fig. 4 is a sectional plan, the same being taken immediately below the top of the condenser; Figs. 5 and 6 are sectional details on the respective lines 5—5 and 6—6 of Fig. 3; Fig. 7 is a diagrammatic representation of the refrigerating system incorporated in the construction illustrated in the preceding views, the heating means being indicated in operative relation to the generator-absorber, and Figs. 8 and 9 are like representations of simplified forms of the invention.

Similar reference characters designate corresponding parts throughout the several views and for convenience in following the ensuing description of the embodiment structurally illustrated in Figs. 1 to 6, reference may be had principally to Fig. 7. 1 is the generator-absorber. 2 is the vapor delivery conduit that rises from the top portion of the generator-absorber and throughout its upper end is enlarged, as at 2ª. A dehydrator 3 is constituted of a coil of tubing that gradually ascends from its receiving end, where it has connection with the upper end of the vapor delivery conduit, to its discharge end that joins a conduit 4 which is shown as leading down through the top of the enlarged end of the vapor delivery conduit to a point where it is reduced and turned laterally, as shown at 4ª, to connect with the top of a sleeve 5 that is open at its lower end and is suitably supported within a casing 7 that has a lateral offset 7ª at its upper end which terminates in a riser 7ᵇ. The riser is open at its top and the beforementioned conduit 4 extends into said riser and its lateral branch 4ª is disposed within the offset 7ª. A tube 8, comprising the gas lift hereinbefore mentioned, rises within the sleeve 5 from a point adjacent the bottom end of the latter and extends through the top of the sleeve, and thereabove the gas lift tube is turned laterally and is inclined downwardly to a point where it opens through the bottom of the offset 7ª adjacent the latter's junction with the riser 7ᵇ.

A drum 10 surrounds the riser 7ᵇ and the adjacent end of the offset 7ª of the casing 7, and the outlet of the drum is formed by a gas return conduit 11 that leads from the lower portion of the drum downwardly through the vapor delivery conduit 2 into the generator-absorber 1 below the minimum liquid level therein, indicated by the dotted line a. The discharge opening of the gas return conduit is below a baffle 12 which joins the conduit immediately above said opening and extends laterally and upwardly therefrom toward the end of the generator-absorber remote from that occupied by said conduit.

As at present preferred, the receiver-evaporator, designated generally by the reference numeral 15, in Figs. 1 to 7, includes a vessel 16, which constitutes the receiver, proper, and a coil 17, which forms the evaporator, proper, the latter communicating with the former through a column 18 that constitutes a sump and opens, at its upper end, into the bottom of the vessel 16. The opposite ends of the coil 17 join the column 18 at points spaced apart vertically of the column and the coil gradually descends from its upper end to its lower end. A brine tank 20 preferably surrounds the coil 17 for a purpose well known to those acquainted with the subject of artificial refrigeration.

A transfer tube 21 communicates with the column 18 immediately adjacent the bottom of the latter and the same extends upwardly and laterally and opens into the casing 7 at a point slightly above the lower end of the gas lift tube 8. In the present preferred embodiment of the invention, the casing 7 is extended through the vessel or receiver 16 and the interiors of the two communicate through an opening 22 in the side of the casing immediately adjacent the top of the vessel. A conduit 25 leads from the upper part of the vessel or receiver 16 and an enlarged vertical portion 25ª thereof is conveniently arranged in juxtaposition to the upper enlarged portion 2ª of the vapor delivery conduit 2, and, at its upper end, said enlarged portion 25ª joins the inlet end of a condenser 27 that consists of a diffusing unit or coil. The discharge end 27ª of the condenser is shown as extending downwardly through a reservoir 28 and opening into a sump 29 thereof. As will appear hereinafter, this reservoir serves both as an auxiliary condenser and as a container for holding the freshly distilled vapors during a heating period while the residue of the previous cycle is being returned from the receiver-evaporator to the generator-absorber section of the system. The condensing action of the reservoir 28 is enhanced and its capacity increased by a tubular extension 30 that is gradually inclined upwardly from its point of communication with the vessel to its closed end remote therefrom so that liquid resulting from condensation therein will drain back into the reservoir. A baffle 31 is preferably disposed within the reservoir for the purpose of more thoroughly diffusing vapors entering the same. The bottom of the sump 29 communicates with the conduit 25 adjacent the enlarged portion 25ª thereof through a by-pass tube or trap 33.

The dehydrator 3, condenser 27 and reservoir 28, with the latter's tubular extension 30, are submerged within a body of cooling liquid, such as water, contained within a tank or receptacle 35; and where the enlarged portions 2ª of the vapor delivery conduit 2, and 25ª of the conduit 25 extend upwardly through the bottom of the tank or receptacle 35, they are surrounded by an insulating member 36 which is shown, in the present instance, as consisting of a sheet metal cylinder that is closed at top and bottom to provide a dead air space about the beforementioned conduits. Obviously, in lieu of the dead air space, suitable insulating material may be placed within the member 36, or any other well known insulating means may be employed for protecting the contents of the tank or receptacle 35 from the heat of the vapors passing through the above mentioned conduits for a material distance upwardly from the bottom of the tank or receptacle. Otherwise the efficiency of the dehydrator and condenser would be unduly lowered early in the heating period because of a more rapid heating up of the cooling liquid.

The vessels and conduits comprising the assembly above described are suitably arranged within and upon a cabinet 40 that is shown in sectional front elevation in Fig. 1. Insulated walls 41 enclose a refrigeration compartment 42 within which is arranged the receiver-evaporator 15, the vessel 16 which constitutes the receiver proper whereof is partly enclosed within the insulated top 43 and partly within a box-like casing 44 that is packed with insulation in accordance with common practice. The brine tank 20, that encloses the evaporator proper, designated 17, is exposed to the interior of the compartment 42, and is shown as made up of a pan-like receptacle 20ª and a cover 20ᵇ. As appears in Fig. 3, the cover has a depression 20ᶜ for the accommodation of the lower end of the casing 7. A freezing space 45, for the accommodation of ice trays (not shown), or anything requiring a freezing temperature, is formed by a reentrant portion of the front wall of the receptacle, the coils of the evaporator 17 being arranged about such reentrant portion.

The tank or receptacle 35 is mounted upon the cabinet 40, while the generator-absorber 1 is located within a flue 46 that is enclosed by the casing of the cabinet along one side of the box-like structure comprising the insulated walls 41. The cabinet casing, including said box-like structure, is supported upon a base frame 47 that is sustained by legs 48. The flue 46 is open at top and bottom and arranged therein below the generator-absorber 1 is a heating device 50. This device may consist of an oil burning unit, such as that shown and described in my application above referred to and which, it may be explained, involves a reservoir preferably having a capacity for a supply of liquid fuel sufficient only to sustain a heating period of maximum duration. This is a common and well known feature of refrigeration apparatus of the class herein described and a more complete description and illustration are deemed unnecessary. The generator-absorber 1 is equipped with heat abstracting fins 1ª; and a suitable grid or screen 55 is desirably positioned across the top of the flue 46.

I will now describe the operation of the invention in connection with the embodiment illustrated in Figs. 1 to 7. As previously pointed out, the system contains a suitable quantity of refrigerant liquor made up of a refrigerating agent and an absorbent therefor, and at the beginning of a cycle of operation the whole amount of the liquid contents of the system, excepting such residue as may have remained in the evaporator section at the conclusion of the previous cycle, is present in the generator-absorber 1, standing therein to about the level indicated by the dotted line b. To initiate a cycle of operation, the heating device 50 is rendered effective, in the present instance by lighting the burners which comprise the same, and upon heat being thus applied to the generator-absorber, the refrigerant liquor therein begins to boil and the resultant vapors rise through the conduit 2 about the drum 10 and the portion of the conduit 4 thereabove and pass through the dehydrator 3 to said conduit 4 through which they descend. In passing through the dehydrator 3, the vapors are subjected to the cooling influence of the body of liquid in the tank or receptacle 35 and as a consequence thereof much, if not all, of the absorbent vapors are condensed and drain back to the generator-absorber section of the system. The refrigerant vapors, with any remaining absorbent vapors, pass on through the conduit 4 and the lateral branch 4ª thereof to the sleeve 5, through which they descend about the gas lift tube 8, imparting heat to the latter. As the vapors pass out through the open lower end of the sleeve 5, they bubble up through the surrounding liquid, rising in part within the casing 7 about the sleeve 5 and in part within the gas lift tube 8, inflating and carrying with them the residue liquid which reposes within said tube. The elevating action of said vapors upon the liquid within the gas lift tube is aided by the heat derived from the hot vapors descending through the sleeve 5, such heat having the effect of gasifying refrigerant that is present in the residue liquid and causing it to rise and elevate the less volatile residue liquid. The liquid thus elevated spills over a little at a time into the laterally and downwardly turned upper end of the tube and is discharged into the drum 10 from which it drains through the gas return conduit 11 to the generator-absorber end of the system.

As previously pointed out, the warm vapors from the generator, coming in contact with the cold residue liquid, causes a heat interchange between the two which tends to cool the vapors and warm the liquid, thereby evaporating refrigerant in the residue liquid and condensing the absorbent content of the vapors. Since this occurs before the vapors reach the condenser, very little if any of the absorbent vapors pass on to that part of the system, resulting in maximum condenser efficiency and purer condensate.

The vapors rising within the casing 7 escape through the opening 22 into the vessel or receiver 16 where, early in the heating period, before the temperature of said vessel is materially raised, a limited amount of said vapors condenses and drains through the column 18 to the evaporator. This limited quantity of freshly distilled refrigerant has a tendency to displace any residue liquid that may repose within the evaporator through the transfer tube 21, thus more effectively clearing the evaporator of residue liquid. From the vessel or receiver 16, the remaining major portion of the vapors pass on through the conduit 25 to the condenser 27, excepting such as will, in the absence of any appreciable amount of liquid in the trap 33, be shunted through said trap and the sump 29 to the reservoir 28 to be condensed therein and drain back into the trap. Therefore, if not at the very beginning of the heating period, very shortly thereafter, all vapors issuing from the generator-absorber, practically cleared of absorbent, will be conducted immediately to the condenser 27 and from which they will be discharged into the reservoir 28.

It will be understood that this delivery of the condensed refrigerant to the reservoir 28 is caused by the increased pressure (incident to the boiling of the refrigerant liquor in the generator-absorber 1) prevailing throughout the entire system excepting within the upper portion of the resevoir 28 which is cut off from the remainder of the system by the body of liquid accumulating therein and reposing within the lower portion of the reservoir and within the sump 29 and trap 33.

The heating period proceeds until the maximum amount of refrigerant is distilled over into the reservoir 28, when the heating device is rendered ineffective, as by the exhaustion of the fuel supply according to the present embodiment. It will be remembered that, during the heating period, the residue liquid in the lower end of the casing 7 is acted upon by the vapors in the manner above described and is carried back to the generator-absorber end of the system.

Now, upon the cessation of heat, the pressure within the system drops to a value considerably below that within the reservoir 28 and as a conscquence the pressure within said reservoir displaces the refrigerant condensate, delivering it through the trap 33 and the adjacent portion of the conduit 25 to the receiver-evaporator 15, filling the same to about the level indicated by the dotted line c. With the cessation of heat and lowering of pressure, the cooling period begins. During this period, evaporation of the relatively pure refrigerant in the receiver-evaporator section of the system takes place, and as the refrigerant evaporates, extracting heat from the freezing space 45 and the refrigeration compartment 42, the resultant gas passes through the opening 22, the casing 7, the offset 7a and riser 7b thereof, the drum 10 and the gas return conduit 11 to the generator-absorber 1 below the minimum liquid level therein. The gas, escaping from the opening in the lower end of the conduit 11, rises slowly along the underside of the inclined baffle 12 and is reabsorbed by the liquor within the vessel 1.

As the vapors descending through the sleeve 5 during the heating period displace the cool liquid from about the gas lift tube and impart heat thereto to enhance its liquid elevating action, so, during the cooling period a benefit is derived from the presence of the cool gas passing back through the casing 7 about the parts of the residue liquid return means. By chilling these parts, the liquid elevating action is avoided for the reason that there would be no gasifying of any refrigerant liquid in the gas lift tube. It may also be pointed out that by surrounding a material portion of the conduit 4 by the hot vapors rising through the enlarged upper end 2a of the vapor delivery conduit during the heating period, the refrigerant vapors are prevented from liquefying prematurely.

In view of the similarity of the three embodiments of the invention herein illustrated, and the obviousness, from the foregoing discussion, of the construction and mode of operation of the simplified forms shown diagrammatically in Figs. 8 and 9, it is believed that a detailed description of the latter forms beyond pointing out their differences is unnecessary. The reference characters applied to the parts of the less elaborate embodiments were effected by adding 100 and 200, respectively, to those that designate the corresponding parts of the form shown in Figs. 1 to 7.

In both modifications, the vapor delivery conduits, designated 102 and 202, respectively, in Figs. 8 and 9, are dissociated from the various tubes and conduits enclosed by the corresponding element of the first described form of the invention, and are joined to the receiving end of the respective dehydrators 103 and 203 at a point outside the tanks 135 and 235.

In the modification disclosed in Fig. 8, the offset 107a of the casing 107 joins the upper end of the gas return conduit 111; and the conduit 104 leads directly from the outlet end of the dehydrator 103 into the upper end of said offset, thence laterally and joins the top of the sleeve 105 that encloses the gas lift 108. Said gas lift, as in the first described embodiment, is turned laterally at its upper end and discharges into the gas return conduit. In the form of the apparatus under discussion, the conduit, designated 125, leads from the top of the receiver 116, and joins the condenser 127 through a part 125a outside the tank 135. The reservoir 128 drains into a trap 129 that is connected through a laterally extending tube 133, leading outwardly through the side of the tank, with the bottom of the previously mentioned part 125a.

Greater simplicity is effected in the form of the invention illustrated in Fig. 9. Here the tube 204 leads directly from the outlet end of the dehydrator 203 downwardly into the receiver 216 where its lower end is turned laterally and thence upwardly beneath the funnel shaped lower end of the gas lift 208, exposed throughout most of its length to the interior of the receiver 216. The gas return conduit 211 leads upwardly from the receiver 216, thence laterally and downwardly into the generator-absorber, and the upper portion of the gas lift 208 is housed within the adjacent end of said conduit and is arranged to discharge through the vertical leg thereof into the generator-absorber. It may be explained that in this case the receiver 216 serves as the evaporator, and in order to form a sump wherein residue liquid may collect about the receiving end of the gas lift, the vessel is tilted downwardly toward the end in which the gas lift is located. In the present case, the reservoir 228 constitutes the condenser, and the conduit 225 leads from the top of the receiver 216 to the bottom of said reservoir.

The vapors issuing from the lower end of the tube 204 (which end is designated 205 because of its similarity to the parts 5 and 105 of the modifications shown, respectively, in Figs. 7 and 8) are liberated within the receiver 216 immediately below the receiving end of the gas lift 208. A part of said vapors ascends through the gas lift to effect the operation thereof, while the remainder rises within the receiver and passes to the condenser 228 via conduit 225. The vapors escaping from the discharge end of the gas lift return through the adjacent end of conduit 211 to the receiver.

From a manufacturing, as well as an economical, standpoint, the simplified constructions have advantages over the more complicated construction in that there is a less number of enclosed tubes; many of the joints are more readily accessible, which facilitates welding, and certain elements are omitted altogether with, of course, a proportional loss of efficiency for which such elements are responsible.

In refrigeration systems of the kind herein disclosed, where compactness is a desideratum and, to this end, the generator may be near or above the elevation of the evaporator, it is very important that not too great a differential in pressure be created within the system as such a condition might result in displacement of liquid from the generator into other parts of the system during the early stages of the heating period when the pressure is rising rapidly.

In this connection it is to be noted that in the propelling of the vapors from the generator to the condenser during the heating period only sufficient excess pressure is required in the generator end of the system to overcome the relatively small head of liquid in the casing surrounding the gas lift. As the vapors pass through this liquid the major portion of them continue on to the condenser while the remaining relatively small portion bubbles up through the gas lift, elevating the residue liquid to a point from which it drains to the generator-absorber. Thus an appreciable back pressure within the generator-absorber is avoided which, if permitted, might, especially in structures where the generator is relatively high with respect to the evaporator, cause liquid to be forced through the gas return conduit to the evaporator end of the system.

Having thus described my invention, what I claim is:

1. An intermittent absorption refrigerator comprising a generator-absorber section, an evaporator, a condenser communicating with the evaporator and being otherwise closed to the system, means for administering heat to the generator-absorber section, a gas lift having its inlet in a residue liquid collecting portion of the evaporator and arranged to deliver liquid to the generator-absorber section, means for conveying vapors from the generator and discharging them into the evaporator in close proximity to the inlet of the gas lift, and means for returning gas from the evaporator to the generator-absorber section.

2. An intermittent absorption refrigerator comprising a generator-absorber section, an evaporator section, a condenser communicating with the evaporator section to deliver condensate thereto, means for administering heat to the generator-absorber section, means for conducting vapors from the generator-absorber section to a portion of the evaporator section in which collects residue liquid that is left in the evaporator section at the conclusion of a cooling period, said means being in open communication with the evaporator section, a gas lift having its inlet in said portion of the evaporator section in proximity to the discharge of said vapor conveying means and having its outlet arranged to deliver residue liquid to the generator-absorber section and vapors to the evaporator section, and means for returning gas from the evaporator section to the generator-absorber section.

3. In an intermittent absorption refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; means for removing from the evaporator practically all liquid remaining therein at the conclusion of a cooling period and delivering it to the generator-absorber section at the beginning of the next heating period, the same comprising a gas lift that is motivated by the flow of vapors from the generator-absorber section.

4. In an intermittent absorption refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; means for removing from the evaporator practically all liquid remaining therein at the conclusion of a cooling period and delivering it to the generator-absorber section at the beginning of the next heating period, the same comprising a gas lift that is motivated by the heat of the vapors passing from the generator-absorber section.

5. In an intermittent absorption refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; means for removing from the evaporator practically all liquid remaining therein at the conclusion of a cooling period and delivering it to the generator-absorber section at the beginning of the next heating period, the same comprising a gas lift that is motivated by the flow of the vapors from the generator-absorber section and also by the heat of such vapors.

6. In an intermittent absorbtion refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; means for removing from the evaporator practically all liquid remaining therein at the conclusion of a cooling period and delivering it to the generator-absorber section at the beginning of the next heating period, the same comprising a gas lift in intimate heat exchanging relation to the vapors in the fluid conveying means.

7. In an intermittent absorption refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; means for returning residue liquid from the evaporator to the generator-absorber section at the beginning of a heating period, the same comprising a gas lift the discharge from which is delivered to the generator-absorber section and through which a part only of the vapors from the generator-absorber section are shunted.

8. In absorption refrigeration apparatus, a gas lift having its inlet in a residue liquid collecting portion of the receiver-evaporator section of the system and extending upwardly therefrom and having its opposite end arranged to discharge into the generator-absorber section of the system, and means for entraining the vapors from the generator-absorber section during the heating period downwardly about the upwardly extending portion of the gas lift and liberating them in the region of the inlet thereof so that a part of the vapors may pass through the tube carrying residue liquid therewith.

9. In absorption refrigeration apparatus, vapor conveying means leading from the generator-absorber section of the system to the receiver-evaporator section thereof and incorporating a downwardly extending sleeve that opens at its lower end in a residue liquid collecting portion of the receiver-evaporator section, and a gas lift rising through said sleeve and having its inlet adjacent the open lower end of the sleeve, the discharge of the gas lift being arranged to deliver residue liquid to the generator-absorber section.

10. In absorption refrigeration apparatus, a generator-absorber, a receiver, an evaporator communicating with the receiver and into which liquid may drain from the receiver, a condenser, fluid conveying means through which the generator-absorber, condenser and receiver communicate for conducting vapors from the generator-absorber and for effecting their ultimate positioning in condensed form in the receiver and for returning refrigerant gas from the receiver-evaporator section of the system to the generator-absorber section thereof, said means including a casing, means for transferring residue liquid from a low part of the evaporator to the bottom portion of said casing, the first mentioned means including a downwardly extending sleeve having an opening at its lower end adjacent the bottom of the casing, and a gas lift having its inlet adjacent said opening of the sleeve and extending upwardly through the sleeve and having its discharge aranged to deliver residue liquid to the generator-absorber section of the system.

11. In absorption refrigeration apparatus, a generator-absorber, a receiver, an evaporator below the plane of the receiver and communicating therewith so as to receive liquid by gravity from the receiver, a condenser, fluid conveying means through which the generator-absorber, condenser and receiver communicate for conveying vapors from the generator-absorber and effecting their ultimate positioning in condensed form in the receiver and for conveying refrigerant gas from the receiver to the generator-absorber, said means including a vertically disposed casing extending through the receiver and having an opening through which it communicates with the receiver adjacent the top of the latter, a conduit for transferring residue liquid from a low part of the evaporator to the bottom portion of the aforesaid casing, the vapor conveying means including a downwardly extending part having a discharge opening adjacent the bottom of the casing, and a gas lift having its inlet disposed adjacent the aforesaid discharge opening and its opposite end arranged to deliver residue liquid to the generator-absorber section of the system.

12. In absorption refrigeration apparatus, a generator-absorber, a receiver, an evaporator below the plane of the receiver and communicating therewith so as to receive liquid by gravity from the receiver, a condenser, fluid conveying means through which the generator-absorber, condenser and receiver communicate for conducting vapors from the generator-absorber and effecting their ultimate positioning in condensed form in the receiver and for conveying refrigerant gas from the receiver to the generator-absorber, said means including a vertically disposed casing extending through the receiver and having an opening through which it communicates with the receiver adjacent the top of the latter, a conduit for transferring residue liquid from a low part of the evaporator to the bottom portion of said casing, the fluid conveying means including a downwardly extending sleeve having a discharge opening adjacent the bottom of the casing, and a gas lift rising through said sleeve and having its inlet disposed adjacent the aforesaid opening of the sleeve and its discharge arranged to deliver residue liquid to the generator-absorber section of the system.

13. In absorption refrigeration apparatus, a generator-absorber, a receiver, an evaporator below the plane thereof and communicating with the receiver so as to receive liquid therefrom by gravity, a vapor delivery conduit rising from the generator-absorber, a dehydrator leading from the upper end of said conduit, a conduit leading from the discharge end of the dehydrator downwardly into the vapor delivery conduit and thence by a branch laterally through the side thereof, a sleeve extending downwardly from the branch and having a discharge opening at its lower end, a casing surrounding said sleeve and communicating with the top portion of the receiver, a conduit through which residue liquid is delivered from a low part of the evaporator to the bottom portion of said casing, a gas lift arranged with its inlet adjacent the opening of said sleeve and rising along the sleeve and having its opposite end turned laterally along the aforesaid branch and disposed within the vapor delivery conduit, the casing having a laterally offset portion enclosing the aforesaid branch and the adjacent portion of the gas lift, said offset portion terminating in a riser within the vapor delivery conduit, a drum within the last mentioned conduit enclosing said riser, and a gas return conduit leading from the bottom of said drum downwardly through the lower portion of the vapor delivery conduit into the generator-absorber below the minimum liquid level therein.

14. In absorption refrigeration apparatus, a generator absorber, a receiver, an evaporator below the plane thereof and communicating with the receiver so as to receive liquid therefrom by gravity, a vapor delivery conduit rising from the generator-absorber, a dehydrator leading from the upper end of said conduit, a conduit leading from the discharge end of the dehydrator downwardly into the vapor delivery conduit and thence by a branch laterally through the side thereof, a sleeve extending downwardly from the branch and having a discharge opening at its lower end, a casing surrounding said sleeve and communicating with the top portion of the receiver, a conduit through which residue liquid is delivered from a low part of the evaporator to the bottom portion of said casing, a gas lift extending vertically through said sleeve and having its inlet adjacent the opening of said sleeve and its upper end turned laterally along the aforesaid branch and disposed within the vapor delivery conduit, the casing having a laterally offset portion enclosing the aforesaid branch and the adjacent portion of the gas lift, said offset portion terminating in a riser within the vapor delivery conduit, a drum within the last mentioned conduit enclosing said riser, and a gas return conduit leading from the bottom of said drum downwardly through the lower portion of the vapor delivery conduit into the generator-absorber below the minimum liquid level therein.

15. In absorption refrigeration apparatus, a generator-absorber, a receiver, an evaporator below the plane thereof and communicating with the receiver so as to receive liquid therefrom by gravity, a vapor delivery conduit rising from the generator-absorber, a dehydrator leading from the upper end of said conduit, a conduit leading from the discharge end of the dehydrator downwardly into the vapor delivery conduit and thence by a branch laterally therefrom, a sleeve extending downwardly from the branch and having a discharge opening at its lower end, a casing surrounding said sleeve and communicating with the top portion of the receiver, a conduit through which residue liquid is delivered from a low part of the evaporator to the bottom portion of said casing, a gas lift extending vertically through said sleeve and having its inlet adjacent the opening of said sleeve and its upper end turned laterally along the foresaid branch and disposed within the vapor delivery conduit, the casing having a laterally offset portion enclosing the aforesaid branch and the adjacent portion of the gas lift, said offset portion terminating in a riser within the vapor delivery conduit, a drum within the last mentioned conduit enclosing said riser, a gas return conduit leading from the bottom of said drum downwardly through the lower portion of the vapor delivery conduit into the generator-absorber below the minimum liquid level therein, a conduit leading from the top portion of the receiver to the region of the aforesaid dehydrator, a condenser having its receiving end joined to the upper end of the last mentioned conduit, a reservoir into which the condenser discharges, and a receptacle for a cooling medium enclosing the dehydrator, condenser and reservoir.

16. In absorption refrigeration apparatus, a generator-absorber, a receiver, an evaporator below the plane thereof and communicating with the receiver so as to receive liquid therefrom by gravity, a vapor delivery conduit rising from the generator-absorber, a dehydrator leading from the upper end of said conduit, a conduit leading from the discharge end of the dehydrator downwardly into the vapor delivery conduit and thence by a branch laterally therefrom, a sleeve extending downwardly from the branch and having a discharge opening at its lower end, a casing surrounding said sleeve and communicating with the top portion of the receiver, a conduit through which residue liquid is delivered from a low part of the evaporator to the bottom portion of said casing, a gas lift extending vertically along said sleeve and having its inlet adjacent the opening of said sleeve and its upper end turned laterally along the aforesaid branch and disposed within the vapor delivery conduit, the casing having a laterally offset portion enclosing the aforesaid branch and the adjacent portion of the gas lift, said offset portion terminating in a riser within the vapor delivery conduit, a drum within the last mentioned conduit enclosing said riser, a gas return conduit leading from the bottom of said drum downwardly through the lower portion of the vapor delivery conduit into the generator-absorber below the minimum liquid level therein, a conduit leading from the top portion of the receiver to the region of the aforesaid dehydrator, a condenser having its receiving end joined to the upper end of the last mentioned conduit, a reservoir into which the condenser discharges, the reservoir having a sump in which the discharge end of the condenser is disposed, and a trap consisting of a bypass tube leading from the bottom of said sump to a part of the conduit through which the receiver and condenser communicate.

17. In absorption refrigeration apparatus, means influenced by pressure differentials in the system for segregating and retaining freshly distilled refrigerant during a heating period and upon the conclusion thereof for delivering it to the receiver-evaporator section, and means motivated by vapors from the generator-absorber section for returning residue liquid from the receiver-evaporator section to the generator-absorber section during the heating period.

18. In absorption refrigeration apparatus, means influenced by pressure differentials in the system for segregating and retaining freshly distilled refrigerant during the heating period and upon the conclusion thereof for delivering it to the receiver-evaporator section, the system including means for conveying vapors from the generator-absorber section and delivering them in condensed form to the receiver-evaporator section, said vapor conveying means opening intermediate said sections in a residue liquid collecting portion of the system, and a gas lift leading from a point adjacent that at which the vapor conveying means opens into the residue liquid collecting portion of the system to a point of delivery into the generator-absorber section of the system.

19. In intermittent absorption refrigeration apparatus including a generator-absorber, a condenser, an evaporator and means for periodically heating the generator-absorber; a receiver for storing freshly-condensed refrigerant outside of the evaporator during the heating period and a gas lift arranged to propel liquid remaining in the evaporator at the beginning of a heating period from the evaporator to the generator-absorber; said gas lift being motivated by the flow of vapors from the generator-absorber to the condenser.

20. In intermittent absorption refrigeration apparatus; a generator-absorber, a condenser, an evaporator, a conduit connecting the top of the generator-absorber with the bottom of the evaporator, a conduit connecting the top of the evaporator with the bottom of the condenser, a conduit connecting the top of the evaporator with a point below the minimum liquid level in the generator-absorber, and a gas lift having its receiving end above the evaporator end of the first-mentioned conduit and its delivery end located so that liquid moved by the gas lift will flow by gravity to the generator-absorber.

21. In an intermittent absorption refrigerator including a generator-absorber section, an evaporator section, a sump in said evaporator section wherein residue liquid collects at the conclusion of a cooling period, means for administering heat to the generator-absorber section, fluid conveying means for conducting vapors from the generator-absorber section and delivering them in condensed form to the evaporator section and for returning gas from the evaporator section to the generator-absorber section, and a gas lift having its inlet disposed within said sump, the aforesaid fluid conveying means opening into the sump so as to liberate the vapors within the evaporator section at such a location that a part thereof may rise through the gas lift.

22. In an intermittent absorption refrigerator including a generator-absorber section, an evaporator section, a sump in said evaporator section wherein residue liquid collects at the conclusion of a cooling period, means for administering heat to the generator-absorber section, fluid conveying means for conducting vapors from the generator-absorber section and delivering them in condensed form to the evaporator section and for returning gas from the evaporator section to the generator-absorber section, and a gas lift having its inlet disposed within said sump, the aforesaid fluid conveying means opening into the sump so as to liberate the vapors within the evaporator section at such a location that a part thereof may rise through the gas lift, the discharge end of the gas lift being arranged to deliver liquid to the generator-absorber section by gravity and so that vapors escaping therefrom may return to the evaporator section.

23. In intermittent absorption refrigeration apparatus, the combination of a receiver, an evaporator below the plane thereof, a sump through which the receiver and evaporator communicate and into which both drain, a casing vented to the receiver above the maximum liquid level therein and communicating with the bottom portion of the sump, and a liquid return conduit having its receiving end located in said casing.

24. In intermittent absorption refrigeration apparatus, the combination of a receiver, an evaporator below the plane of the receiver, communicative connections between the receiver and evaporator through which the former drains into the latter and including a sump into which both drain, a casing communicating with the receiver and with said sump, and a liquid return conduit having its receiving end located within the casing.

25. In intermittent absorption refrigeration apparatus, the combination of a receiver, a sump into which the receiver drains, an evaporator at a lower elevation than the receiver communicating with the sump at vertically spaced points and arranged to drain thereinto, an enclosure that communicates with the receiver, and with the sump adjacent the bottom of the latter to receive residue liquid therefrom, and a liquid return conduit having its receiving end located within the enclosure.

26. In intermittent absorption refrigeration apparatus, the combination of a receiver, a sump into which the receiver drains, an evaporator coil whose respective ends communicate with the sump at different elevations and which is arranged to drain into the sump, a casing that communicates with the receiver and with the bottom portion of the sump, and a liquid return conduit having its receiving end located within the casing.

27. In intermittent absorption refrigeration apparatus, the combination of a receiver, an evaporator below the plane thereof, a sump through which the receiver and evaporator communicate and into which both drain, a casing communicating with the receiver and extending below the bottom plane thereof, a transfer conduit through which residue liquid is delivered from the sump to the casing, said conduit opening into the casing at a point below the bottom plane of the receiver and the region of the top plane of the evaporator, and a liquid return conduit having its receiving end located in the casing.

WILBUR G. MIDNIGHT.